(12) United States Patent
Amiri et al.

(10) Patent No.: US 7,818,893 B2
(45) Date of Patent: Oct. 26, 2010

(54) MOTOR VEHICLE OIL DIPSTICK MEANS

(75) Inventors: Zakaria Amiri, Paris (FR); Frederic Dos Santos, Puteaux (FR); Eric Grizaud, Acheres (FR); Christophe Monereau, Le Mesnil le Roi (FR)

(73) Assignee: Renault s.a.s., Boulogne (FR)

( * ) Notice: Subject to any disclaimer, the term of this patent is extended or adjusted under 35 U.S.C. 154(b) by 255 days.

(21) Appl. No.: 12/063,451

(22) PCT Filed: Jul. 27, 2006

(86) PCT No.: PCT/FR2006/050759

§ 371 (c)(1),
(2), (4) Date: Aug. 4, 2008

(87) PCT Pub. No.: WO2007/017607

PCT Pub. Date: Feb. 15, 2007

(65) Prior Publication Data

US 2010/0154237 A1    Jun. 24, 2010

(30) Foreign Application Priority Data

Aug. 10, 2005    (FR) .................................. 05 08482

(51) Int. Cl.
*G01F 23/04* (2006.01)
(52) U.S. Cl. .......................................... 33/726; 33/723
(58) Field of Classification Search ........... 33/722–731; 73/290 B
See application file for complete search history.

(56) References Cited

U.S. PATENT DOCUMENTS

| | | | | |
|---|---|---|---|---|
| 3,594,906 A | * | 7/1971 | Kerfoot | 33/717 |
| 3,662,470 A | * | 5/1972 | Sasgen | 33/731 |
| 3,735,494 A | * | 5/1973 | Gumtow | 33/726 |
| 3,738,176 A | * | 6/1973 | Kerfoot | 33/717 |
| 4,155,166 A | * | 5/1979 | Rochow et al. | 33/727 |
| 4,174,574 A | * | 11/1979 | Kirchweger et al. | 33/731 |
| 5,014,445 A | * | 5/1991 | Martell | 33/731 |
| 5,992,037 A | * | 11/1999 | Klotz | 33/722 |
| 2004/0143985 A1 | | 7/2004 | Porter et al. | |

FOREIGN PATENT DOCUMENTS

| | | | |
|---|---|---|---|
| DE | 4122288 A1 | * | 3/1992 |
| EP | 1450140 A1 | * | 8/2004 |
| JP | 2000 283823 | | 10/2000 |

* cited by examiner

*Primary Examiner*—R. A. Smith
(74) *Attorney, Agent, or Firm*—Oblon, Spivak, McClelland, Maier & Neustadt, L.L.P.

(57) ABSTRACT

An oil dipstick structure including a tubular plastic dipstick guide with an opening at one end thereof, and a dipstick rod connected to a sealing member at one end. The dipstick guide includes a dipstick abutment engageable by an abutment member on the dipstick rod when the dipstick rod is inserted into the guide. The dipstick abutment is located in the dipstick guide at the opposite end from the opening, and the length thereof is such that the dipstick abutment extends out of the dipstick guide when the abutment member of the dipstick rod is in engagement with the dipstick abutment.

12 Claims, 3 Drawing Sheets

MOTOR VEHICLE OIL DIPSTICK MEANS

The present invention relates to dipsticks, particularly those that are placed on the engine block of vehicles in order to check the oil level inside the latter.

More precisely, it relates to an oil dipstick particularly for a vehicle, comprising on the one hand a tubular dipstick guide having an opening at its top end, and on the other hand a dipstick shank comprising a measuring section connected to a guide closure endpiece, having as its function the measurement of the oil level and the filling of engine oil for customer and after-sales use.

Despite the presence of electronic syshanks for checking the oil level with the display of alarms on the dashboard, it is still desirable to maintain the ability to read the oil level directly in the engine on a manual dipstick that can be accessed in the engine compartment.

When the environmental constraints make it necessary to lengthen the dipstick guide and to adopt for the latter a path that is nonrectilinear, it is usual to use flexible dipstick shanks that are easy to insert into the guide. A problem that arises then is that the increased length and the principle of assembly increase the tolerances and affect the accuracy of the level reading.

Efforts are therefore made to enhance the accuracy of the oil level reading when checking via the oil dipstick.

Specifically, when the level is checked, the frame of reference for the measurement is the dipstick shank which comes to an abutment in the guide, therefore at the top of the guide, where there is the maximum dispersion due to the accumulation of the dimensional tolerances of the parts. There is therefore a risk of maximum difference in the oil level reading. This is described by U.S. Pat. No. 4,155,166 with a dipstick whose frame of reference is situated at the stopper. This stopper is surrounded by a rubber ring which will make it possible to keep the dipstick shank in place.

Another solution proposed to solve this problem consists in using ever shorter dipsticks that are placed as close as possible to the oil level. These dipsticks are therefore not easy to access.

Another technique is to place the measurement frame of reference closest to the oil level. This is proposed by the Renault patent FR-2 851 652 which describes a dipstick guide comprising a top portion and a bottom portion connected together, the top portion being partially curved. This guide, which comprises a shoulder at a distance from the engine crankcase, is made on a tube connected to the engine crankcase. This shoulder interacts with the abutment means of the dipstick shank. These abutment means allow the shank to be centered. But the total dimensional errors due to the tolerances of the parts is considerable.

U.S. Pat. No. 4,174,574 proposes a syshank in which the bottom portion of the dipstick guide has a diameter that is smaller than that of the top portion, these portions being connected by a seal between the engine crankcase and the oil sump. The diameter difference forms an abutment that will serve as a frame of reference. These two characteristics are designed to cushion the impacts sustained by the dipstick and therefore prevent the liquid from being too dispersed. Also, since the abutment is formed on a tube inserted into the crankcase, the device has the same disadvantages as the previous patent.

Patent DE 4 122 288 describes a dipstick whose dipstick guide comprises, at its end placed at the bottom of the oil crankcase, a part forming a stop for the dipstick shank. When the shank butts against this part, the level can then be read. This part plays the same role as an abutment.

Document US 2004/143985 describes a dipstick according to the preamble of claim 1.

These various dipsticks, even though they make it possible to reduce liquid level reading errors, still have their frame of reference situated in zones where dispersion is not the smallest.

Therefore, the object of the present invention is to remove one or more of the disadvantages of the prior art.

This object is achieved by defining an oil dipstick comprising a plastic tubular dipstick guide having at one end an opening and a dipstick shank consisting of a shank connected at one end to a closure endpiece, the dipstick guide comprising a dipstick bump stop on which an abutment placed on the dipstick shank rests when the latter is inserted in the guide, characterized in that the bump stop is placed in the dipstick guide at the opposite end from the opening and has its length designed so that it protrudes outside the dipstick guide when the abutment of the dipstick shank butts against the bump stop.

According to another feature of the invention, the guide comprises on the inside at the end an inner circular rim that is sleeve-fitted into the bore of the engine crankcase.

According to another feature of the invention, the opening comprises rotary closing means.

According to another feature of the invention, the closure endpiece is formed by a stopper comprising rotary closure means of the ¼-turn type.

According to another feature of the invention, the distance between the stopper and the abutment allows the abutment to rest on the bump stop when the stopper is placed on the opening without being closed, to allow the shank to buckle.

According to another feature of the invention, the abutment of the dipstick shank is a sphere with a diameter that is smaller than the tube and greater than the diameter of the bump stop and placed so that it rests on the bump stop when the dipstick shank is resting in the guide at the opposite end from the opening.

According to another feature of the invention, the bump stop has the shape of a cylinder, hollow, whose diameter is suited to that of the dipstick guide so that it is possible to insert it into the dipstick guide at the end that is sleeve-fitted into the bore of the engine crankcase, while allowing clearance between the external diameter of the abutment and the internal diameter of the guide.

According to another feature of the invention, the bump stop comprises in its center at least three shoulders, the new diameter formed by the shoulders being sufficient to allow the dipstick shank to pass but insufficient to allow the abutment to pass.

According to another feature of the invention, the bump stop comprises, at one end on the edges of the cylinder, at least two catches allowing it to be clipped to the circular rim of the guide by a clipping of the captive type allowing a longitudinal travel of the bump stop.

According to another feature of the invention, the length of the bump stop is designed so that the bump stop protrudes slightly from the guide in order to be placed in contact with the engine crankcase via the opposite end from that at which the rim is situated when the abutment of the dipstick butts against the bump stop, and the catches are not in contact with the circular rim of the guide.

The invention also relates to a vehicle engine comprising at least one engine crankcase and one oil dipstick, the dipstick comprising a plastic tubular dipstick guide having at one end an opening and a dipstick shank consisting of a shank connected at one end to a closure endpiece, the dipstick guide comprising a dipstick bump stop on which an abutment placed on the dipstick shank rests when the latter is inserted into the guide, characterized in that the bump stop is placed in the dipstick guide at the opposite end from the opening and has its length designed so that it protrudes outside the dipstick guide when the abutment of the dipstick shank butts against the bump stop, so that the bump stop rests directly on the engine crankcase.

According to another feature of the invention, the guide comprises, close to the opening, on one side, a fastening lug comprising an orifice making it possible to fasten the guide to an air manifold of the engine.

According to another feature of the invention, the guide has its end opposite to that of the opening sleeve-fitted into a bore of the engine crankcase, said end comprising an O-ring in order to ensure a seal with the engine crankcase.

The invention, with its features and advantages, will emerge more clearly on reading the description made with reference to the appended drawings given as nonlimiting examples in which.

The invention will now be described with reference to FIGS. 1 to 4.

Figure 1:
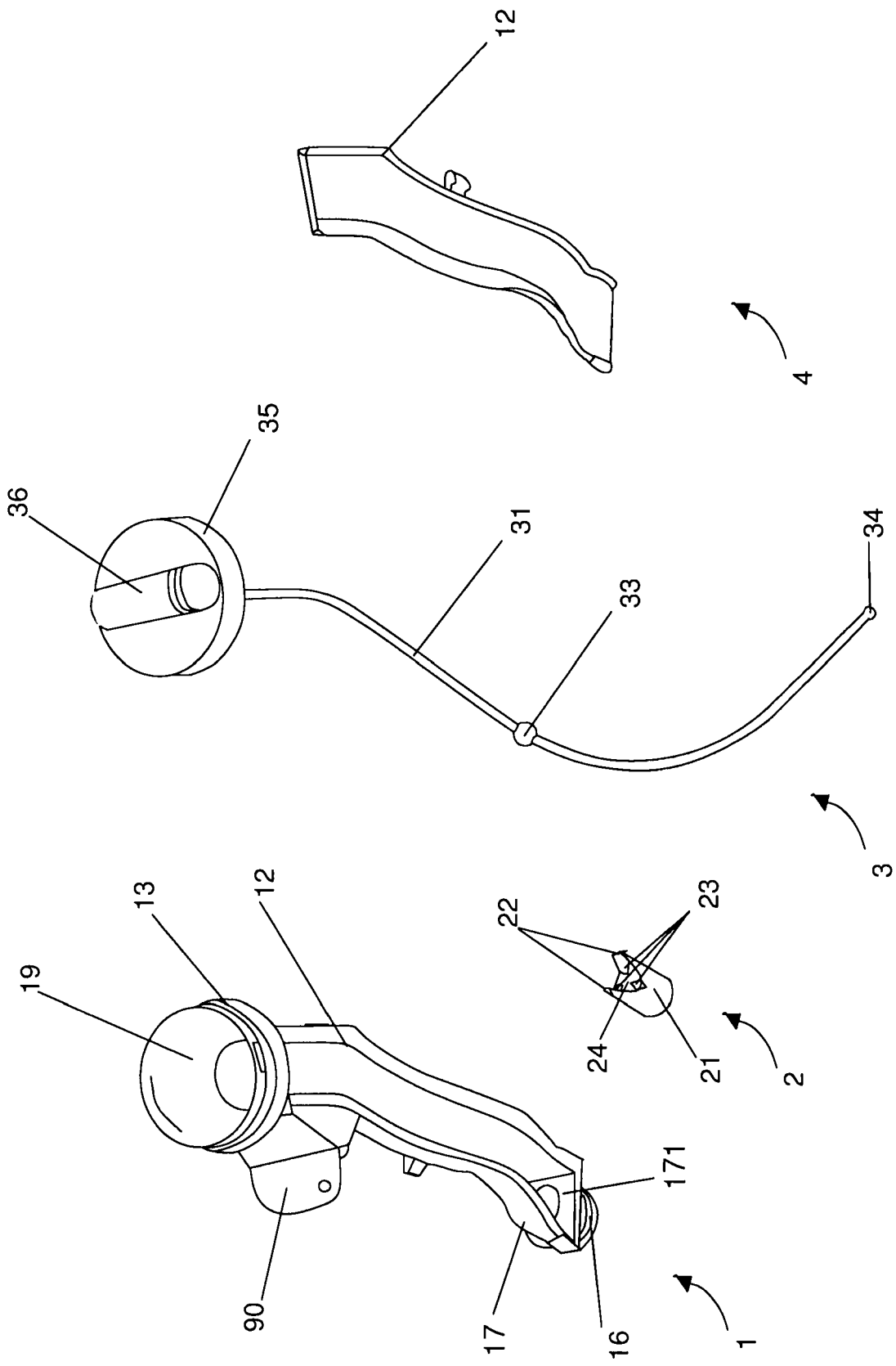
FIG. 1 is a view in elevation of the parts forming the oil dipstick according to the invention.

As illustrated in FIG. 1, the oil dipstick (100) consists of a dipstick guide, a dipstick shank (3) supporting a closure endpiece (35) and a bump stop (2).

The oil dipstick guide is therefore a tubular part which, in a variant, may consist of two portions (1, 4), these two portions (1, 4) being assembled and friction-welded together.

Figure 2:
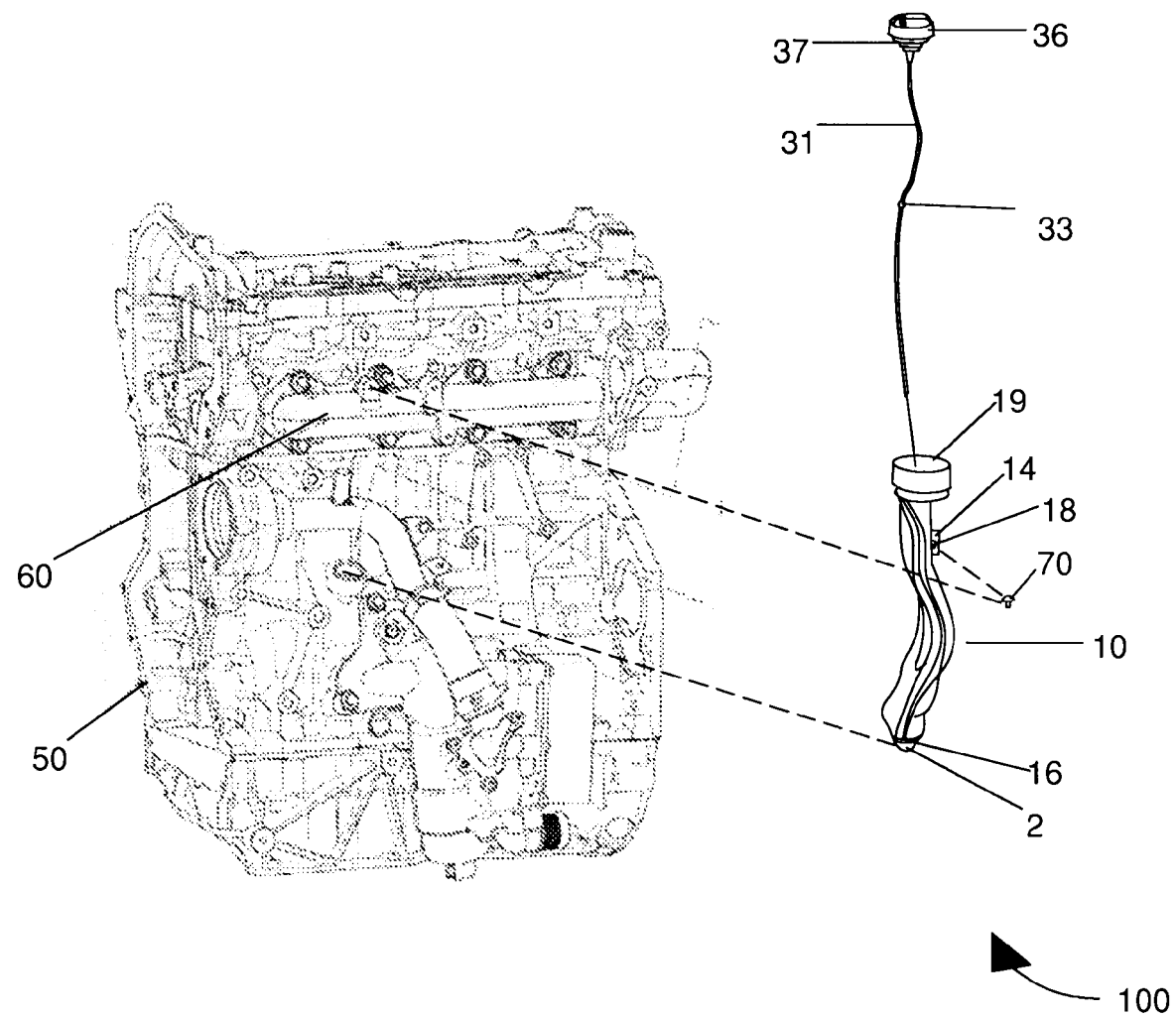
FIG. 2 is a view in elevation of the dipstick according to the invention placed on the vehicle engine.

The guide (10) comprises at one end an opening (19) and on one side a fastening lug (14) comprising an orifice (18) making it possible to fasten the guide to an air manifold (60) of the engine with fastening means (70) of the screw type illustrated in FIG. 2.

The opening (19) comprises rotary closure means (13).

The guide (10) is fastened to the engine crankcase (50) by sleeve-fitting, via the end (17) opposite to that of the opening (19). This end (17) comprises an external O-ring (16) making it possible to provide the seal between the guide (10) and the engine crankcase (50) as illustrated in FIG. 2.

The guide (10) is partially curved (12) close to the opening (19) and comprises on the inside a circular rim (171) at the end (17) that is sleeve-fitted into the engine crankcase (50).

The guide may also comprise means (90) for fastening a cable or a hose for example.

At one of these ends, the shank (31) comprises a closure endpiece (35) of the guide (10). This endpiece (35) is formed by a stopper comprising, on one of its two faces, rotary closure means (37) of the ¼-turn type, oriented toward the shank, interacting with the rotary closure means (13) of the opening (19) of the dipstick guide (10). An O-ring may be placed at the ¼-turn rotary closure means (37) in the stopper making it possible to provide a seal between the stopper (35) and the guide (10). On the surface opposite to that containing the ¼-turn type rotary closure means (37), the closure endpiece (35) comprises a rim (36) that is centered on the middle of the endpiece and whose length is identical to the diameter of the closure endpiece (35). This rim (36) makes it easier to grasp the stopper when opening and closing the dipstick.

In a variant of the invention, the rotary type means (37, 13) may be replaced by screw-type means.

This shank (31) comprises an abutment (33). This abutment (33) is a sphere (33) placed so that it rests on the bump stop (2) that is in the dipstick guide (10) when the dipstick shank (31) is resting on the opening of the guide (10). The length of the shank allows the abutment to rest on the bump stop even when the stopper is not closed but just placed on the opening (19) of the guide (10), allowing the bump stop to rest on the engine crankcase (50).

The bump stop (2) which will therefore serve to improve the measurement of the oil level has the shape of a cylinder (21), hollow (24), whose diameter is suited to that of the dipstick guide (10) so that it is possible to insert it into the dipstick guide at the end (17) that is sleeve-fitted into the engine crankcase (50) while leaving a certain clearance between the external diameter of the bump stop and the internal diameter of the guide. This bump stop (2) comprises at its center at least three shoulders (23) on which the sphere (33) will rest, the new diameter formed by the shoulders (23) being sufficient to allow the dipstick shank (31) to pass.

The bump stop (2) comprises, at one end, on the edges of the cylinder, at least two catches (22). These catches (22) allow the bump stop to be clipped to the inner circular rim of the guide. The clipping is of the captive type. The clearance of the bump stop and the captive clipping allow the bump stop to slide freely in the dipstick guide and also to position itself correctly if the guide should be slightly inclined relative to the bore (51) of the engine crankcase (50).

This bump stop (2) is placed in the dipstick guide (10) at the end (17); its end opposite to the catches (22) slightly protrudes outside the guide (10) and is in contact with the engine crankcase (50).

When it is used, the dipstick guide (10) is therefore sleeve-fitted into the bore (51) of the engine crankcase (50), and then, once fastened, the dipstick shank (31) is placed in the dipstick guide (10) and the seal is formed by closing the stopper (35) by a quarter-turn. The guide (10) is fastened to the air inlet manifold (60) thanks to the fastening means (14) via a screw-type syshank (70), as illustrated in FIG. 2. The bump stop (2) which protrudes from the guide rests on the engine crankcase (50). The abutment, whose diameter is smaller than the diameter of the guide, but greater than the internal diameter of the bump stop, therefore rests on the bump stop.

Figure 3:
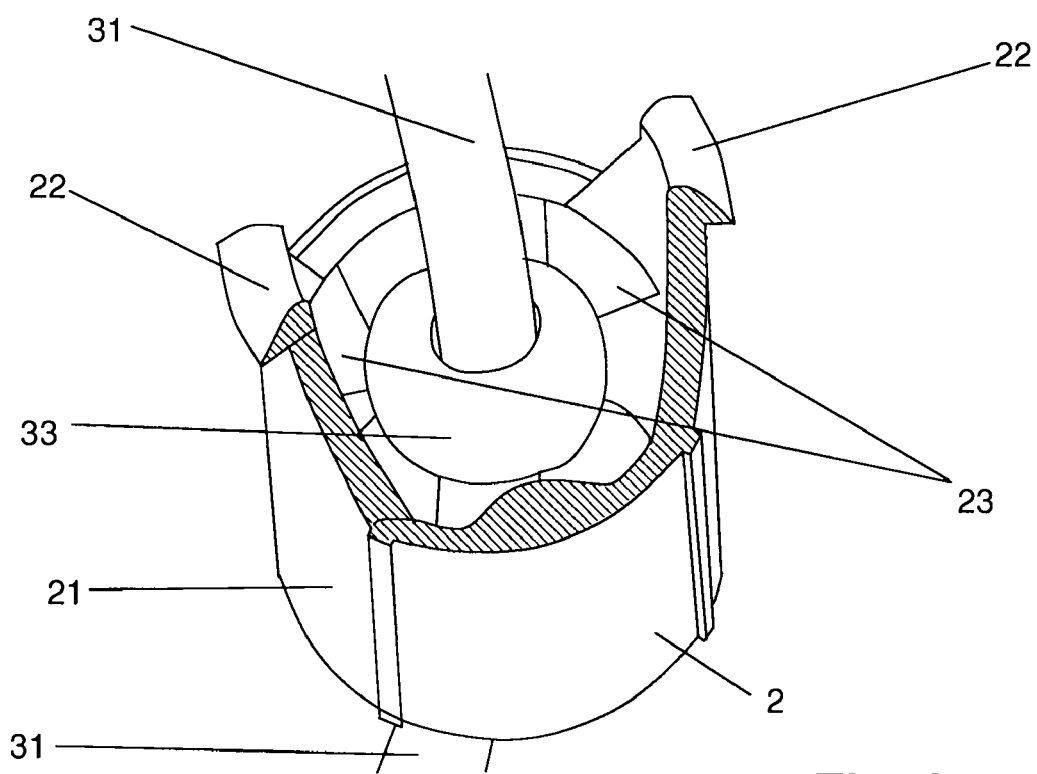
FIG. 3 is a view in elevation of the frame of reference zone of the dipstick according to the invention.
Figure 4:
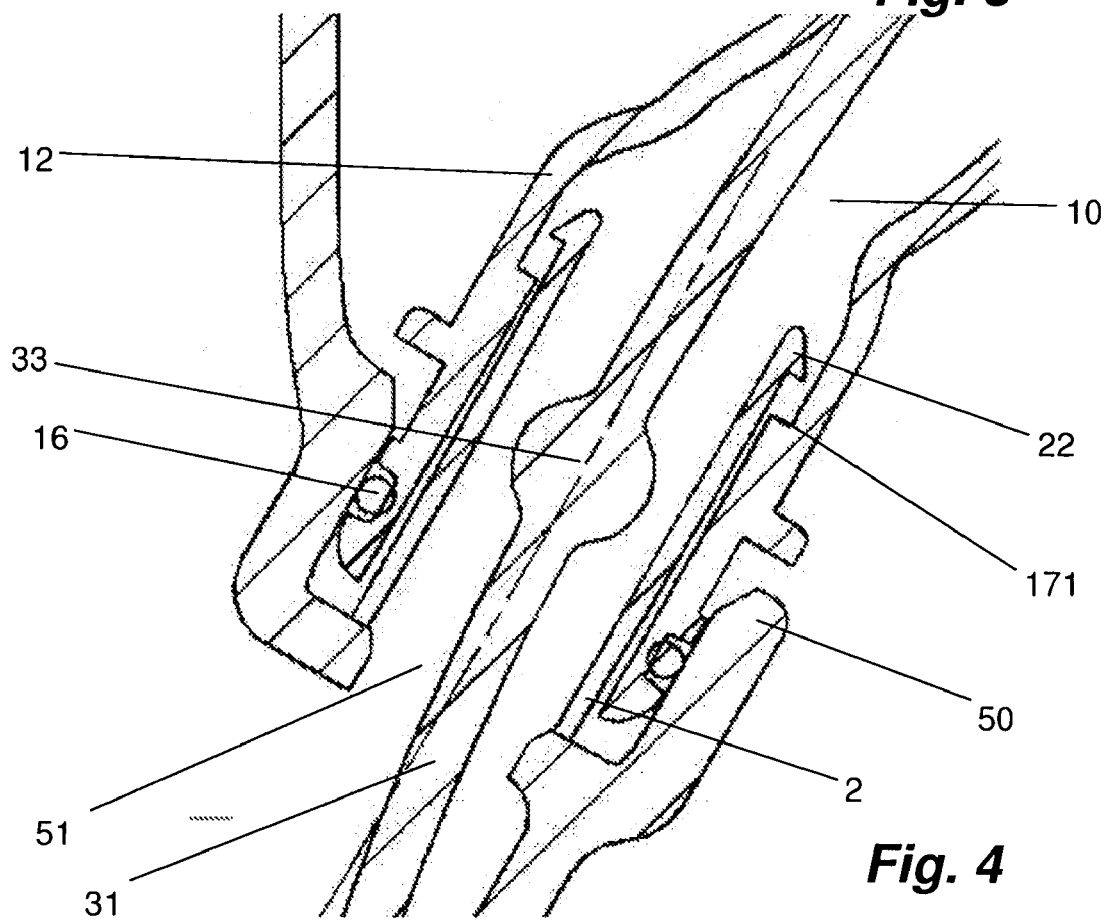
FIG. 4 is a profile section of the zone of insertion of the dipstick at the engine crankcase.

As illustrated in FIGS. 3 and 4, the principle of the solution is achieved by the contact that is made between the sphere (33) of the dipstick shank (31), the dipstick bump stop (2) and the engine crankcase (50). The dipstick shank (31) fixedly attached to the stopper (35) rests on the dipstick bump stop (2) when the latter is screwed on, which causes the dipstick bump stop (2) to rest on the engine crankcase (50). It is at this moment that it is possible to have the best accuracy of oil level reading; specifically, the chain of tolerances that links the number of parts that are involved in the syshank comprises the smallest number of links relative to standard dipsticks. The measurement is therefore made with greater accuracy.

Additionally, the fact that the frame of reference for measuring the oil level is not at the top of the guide (where the tightening takes place) but at the dipstick bump stop (2) considerably reduces dispersion.

This solution has an advantage when the user has sinuous paths between the zone of contact of the dipstick bump stop (2) on the engine crankcase (50) and the top of the guide, because it is sufficient merely to correctly estimate the curvature (12), the buckling of the dipstick wire and determine the length of the dipstick wire between the stopper and the abutment in consequence so that the bump stop rests against the crankcase every time.

Another advantage of this technical solution is that, when the user checks his oil level, it is no longer necessary to screw on the stopper (35). It is sufficient merely to insert the dipstick shank (31) in the guide (10) until it is possible to place the stopper (35) on the top of the guide and, because of the difference in length between the top portion of the guide and the dipstick wire, the user ensures that the dipstick is on its frame of reference for checking the level every time. It is therefore possible to read off its oil level with no accumulation of error.

It should be obvious to those skilled in the art that the present invention allows embodiments in many other specific forms without departing from the scope of application of the invention as claimed. Consequently, the present embodiments should be considered as an illustration, but may be modified in the field defined by the scope of the attached claims, and the invention should not be limited to the details given hereinabove.

The invention claimed is:

1. A vehicle engine oil dipstick comprising:
   a plastic tubular dipstick guide having at one end an opening and a dipstick shank connected at one end to a closure endpiece,
   the dipstick guide comprising a dipstick bump stop on which an abutment placed on the dipstick shank rests when the dipstick shank is inserted in the guide,
   wherein the bump stop is placed in the dipstick guide at the opposite end from the opening and has a length such that the bump stop protrudes outside the dipstick guide when the abutment of the dipstick shank butts against the bump stop.

2. The dipstick as claimed in claim 1, wherein the guide comprises on an inside at an end an inner circular rim that is sleeve-fitted into a bore of an engine crankcase.

3. The dipstick as claimed in claim 1, wherein the opening comprises rotary closing means.

4. The dipstick as claimed in claim 1, wherein the closure endpiece is formed by a stopper comprising rotary closure means of ¼-turn type.

5. The dipstick as claimed in claim 1, wherein the distance between the stopper and the abutment allows the abutment to rest on the bump stop when the stopper is placed on the opening without being closed, to allow the shank to buckle.

6. The dipstick as claimed in claim 1, wherein the abutment of the dipstick shank is a sphere with a diameter that is smaller than the tube and greater than the diameter of the bump stop and placed so that the abutment rests on the bump stop when the dipstick shank is resting in the guide at the opposite end from the opening.

7. The dipstick as claimed in claim 1, wherein the bump stop has a shape of a cylinder, hollow, whose diameter is suited to that of the dipstick guide so that the bump stop can be inserted into the dipstick guide at an end sleeve-fitted into a bore of an engine crankcase, while allowing clearance between the external diameter of the abutment and the internal diameter of the guide.

8. The dipstick as claimed in claim 7, wherein the bump stop comprises in its center at least three shoulders, a diameter formed by the shoulders being sufficient to allow the dipstick shank to pass but insufficient to allow the abutment to pass.

9. The dipstick as claimed in claim 1, wherein the bump stop comprises, at one end on the edges of the cylinder, at least two catches allowing the bump stop to be clipped to a circular rim of the guide by a clipping of captive type allowing a longitudinal travel of the bump stop.

10. A vehicle engine comprising:
    at least one engine crankcase and one oil dipstick,
    the dipstick comprising a plastic tubular dipstick guide having at one end an opening and a dipstick shank, connected at one end to a closure endpiece,
    the dipstick guide comprising a dipstick bump stop on which an abutment placed on the dipstick shank rests when the dipstick shank is inserted into the guide,
    wherein the bump stop is placed in the dipstick guide at the opposite end from the opening and has a length such that the bump stop protrudes outside the dipstick guide when the abutment of the dipstick shank butts against the bump stop, so that the bump stop rests directly on the engine crankcase.

11. The dipstick as claimed in claim 10, wherein the guide comprises, close to the opening, on one side, a fastening lug comprising an orifice making it possible to fasten the guide to an air manifold of an engine.

12. The dipstick as claimed in claim 10, wherein the guide has its end opposite to that of an opening sleeve-fitted into a bore of an engine crankcase, the end comprising an O-ring to ensure a seal with the engine crankcase.

* * * * *